Aug. 13, 1963   R. DRESSER   3,100,518
PNEUMATIC SAFETY TIRE CONSTRUCTION
Filed Feb. 7, 1962
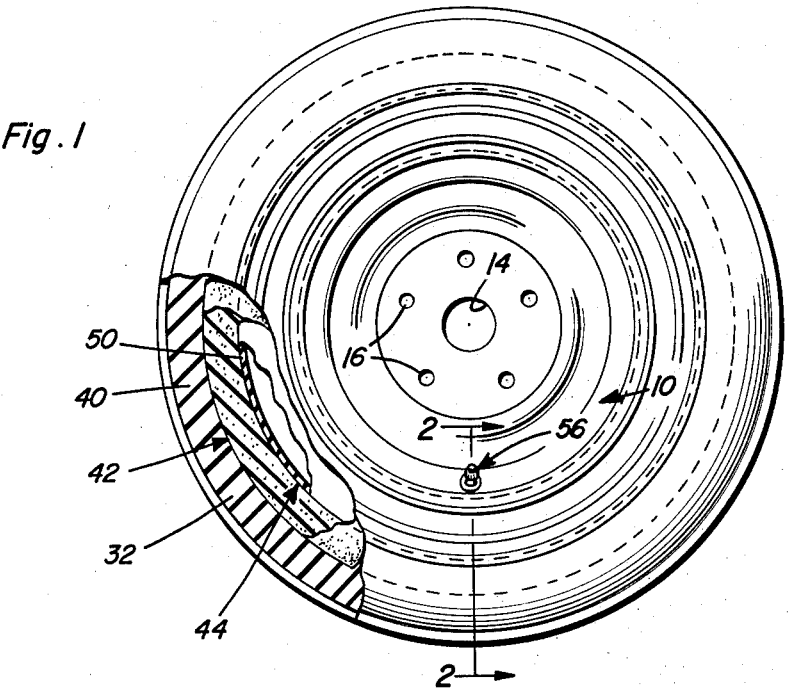
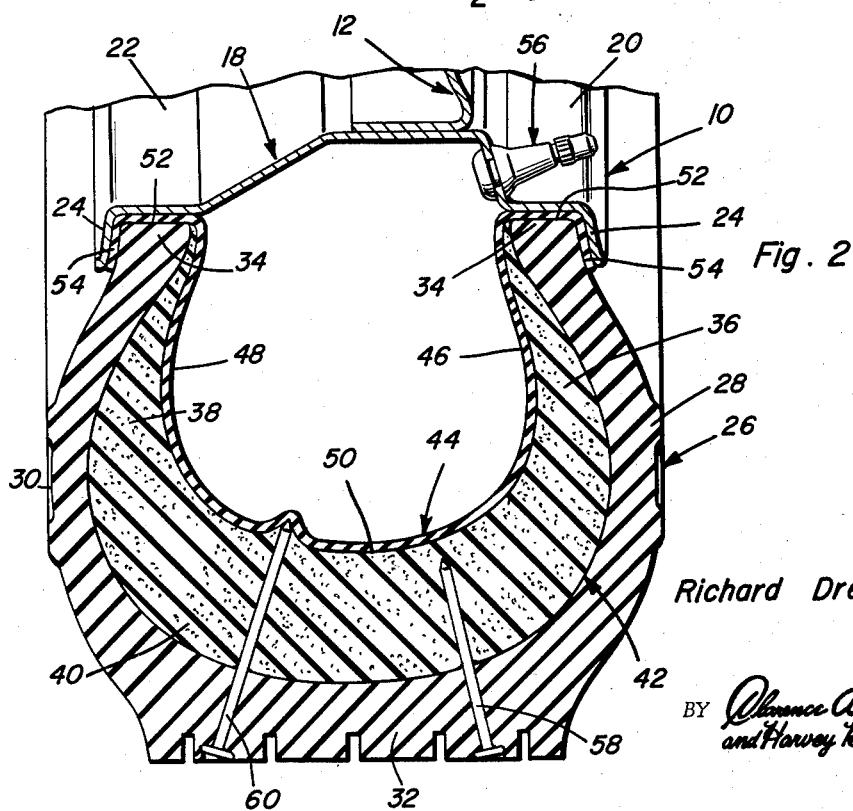
Richard Dresser
INVENTOR.

United States Patent Office 3,100,518
Patented Aug. 13, 1963

3,100,518
PNEUMATIC SAFETY TIRE CONSTRUCTION
Richard Dresser, P.O. Box 245, Moran, Tex.
Filed Feb. 7, 1962, Ser. No. 171,631
3 Claims. (Cl. 152—347)

This invention relates to a novel and useful pneumatic safety tire construction and to a tire construction which has been specifically designed for providing relatively inexpensive substantially puncture proof tires.

The tire construction of the instant invention has as its prime object to provide an inexpensive puncture resistant tire.

A further object of this invention, in accordance with the immediately preceding object, is to provide a tire construction which will absorb shocks with a greater cushioning effect and thereby render a smoother ride.

A still further object of this invention is to provide a tire construction which will enable a conventional tire casing to effect greater contact with the road surface while still being capable of supporting comparable loads.

Another object of this invention is to provide a tire construction which will be capable of rendering a smoother ride when inflated to a given pressure than a conventional type of tire which is inflated to the same pressure thereby providing a tire which may be over inflated to handle occasional heavier loads while still maintaining a good riding quality.

A further object of this invention, in accordance with the preceding objects, is to provide a safety tire construction which may be readily incorporated into conventional types of wheel assembly and tire constructions presently being utilized.

Another object of this invention is to provide a pneumatic safety tire construction in accordance with the preceding objects which is tubeless in nature.

A final object to be specifically enumerated herein is to provide a pneumatic safety tire construction in accordance with the preceding objects which will conform to conventional forms of manufacture, be of simple construction and easy to install so as to provide a device that will be economically feasible, long lasting and relatively trouble free during installation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of a wheel assembly having a pneumatic safety tire in accordance with the present invention mounted thereon, parts of the tire construction being broken away and shown in section;

FIGURE 2 is an enlarged fragmentary vertical sectional view taken substantially upon the plane indicated by the section line 2—2 of FIGURE 1.

Referring now more specifically to the drawings the numeral 10 generally designates a wheel assembly of conventional design which may be seen to include a hub portion generally referred to by the reference numeral 12 that is centrally apertured as at 14 for receiving the spindle portion of a vehicle wheel mounting assembly. It will be noted that the hub portion 12 is also apertured as at 16 for the reception of mounting studs or wheel lugs when mounting the wheel assembly 10 on a vehicle wheel hub.

The wheel assembly 10 also includes a rim portion generally referred to by the reference numeral 18 and it may be observed that the rim portion 18 is generally cylindrical and defines a pair of axially spaced cylindrical tire seating flanges 20 and 22 which each terminate outwardly in an outwardly directed annular abutment flange 24. Accordingly, it may be seen that the wheel assembly 10 is conventional and it will be noted that a conventional type of tire casing generally referred to by the reference numeral 26 and including a pair of laterally spaced generally annular side walls 28 and 30 interconnected at their outer ends by means of an integral crown or tread portion 32 is mounted on the wheel assembly 10 in a substantially conventional manner. The inner marginal edge portions of the side wall portions 28 and 30 define annular seating bead portions 34 and it will be noted that an annular inner tire which is substantially U-shaped in cross-section is disposed within the tire casing 26.

The inner tire includes a pair of annular sides 36 and 38 which are interconnected at their outer peripheral edge portions by means of a circumferentially extending bight portion 40. It will be noted that the outer surfaces of the sides 36 and 38 conform to the contours of the inner surfaces of the side wall portions 28 and 30. Further, it will be noted that the inner marginal edge portions of the sides 36 and 38 are tapered and that the sides 36 and 38 increase gradually in thickness from their free inner marginal edge portions toward the bight portion 40 at which point the sides 36 and 38 are on the order of two to three inches in thickness.

The inner tire which is referred to in general by the reference numeral 42 is constructed of lightweight resilient material and of a material which is foam-like in nature.

A flexible inner annular shield tube generally referred to by the reference numeral 44 is provided and it will be noted that the shield tube is also U-shaped in cross-section and that it is disposed within the inner tire 42. The shield tube includes a pair of spaced annular leg portions 46 and 48 which are interconnected at their outer marginal edge portions by means of an integral bight 50. The shield tube 44 is constructed of somewhat flexible but tough material which is resistant to being punctured by nails which may become embedded in the casing 26 or in the inner tire 42 and it will be noted that the inner marginal edge portions of the legs 46 and 48 each terminates in an outwardly laterally directed cylindrical flange 52 which in turn terminates at its outer end in an outwardly directed annular abutment flange 54.

It will be noted that the sealing and abutment flanges 52 and 54 are disposed between the bead portions 34 and the corresponding seating and abutment flanges 20, 22 and 24 of the wheel assembly 10. Accordingly, it may be seen that air pressure within the area confined between the confronting surfaces of the shield tube 44 and the wheel assembly 10 will urge the bead portions 34 outwardly to clampingly engage the abutment flanges 54 between the bead portions 34 and the abutment flanges 24. In this manner, the internal surfaces of the shield tube 44 are disposed in fluid-tight sealing engagement with the corresponding surfaces of the flanges 20, 22 and 24. Therefore the tubeless valve assembly 56 may be utilized to introduce air under pressure into the shield tube 44.

As can best be seen from FIGURE 2 of the drawings the free ends of the sides 36 and 38 of the inner tire 42 terminate immediately adjacent the innermost marginal portions of the bead portions 34. In this manner, there will be very little relative movement between the inner tire 42 and the casing 26 to chafe the shield tube 44. In addition, it is to be understood that the shield tube 44 is constructed of a material which will render it tough enough to resist puncture by either of the nails 58 or 60 and that in fact the shield tube 44 as viewed in FIGURE 2 of the drawings will have a tendency to back the nail 60 out of the casing 26.

However, should the shield tube 44 be punctured, the material from which the inner tire 42 is constructed will snugly embrace the object by which the shield tube 44 was punctured and thus, air from within the interior of the shield tube 44 will not be allowed to escape to the ambient atmosphere as the inner tire 42 is fluid impervious and the flanges 52 of the shield tube 44 are disposed in fluid sealing engagement with the bead portions 34 of the casing 26.

In operation, when the tire construction of the instant invention is inflated, a layer of soft sponge rubber of approximately two to three inches in thickness is disposed between the shield tube 44 and the casing 26. This thickness of foam-like sponge rubber offers an extremely soft ride and enables a larger area of the casing 26 to come in contact with the road surface. Accordingly, the casing 26 is afforded a better frictional engagement with the road surface and skidding and slipping on wet road surfaces is appreciably reduced.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a wheel assembly having an outer rim portion defining a pair of interconnected axially spaced cylindrical tire seating flanges terminating at their remote ends in a pair of radially outwardly directed annular abutment flanges, a pneumatic tire construction comprising a tire casing including a pair of laterally spaced generally annular side wall portions interconnected at their outer marginal edge portions by means of an integral crown tread portion, the inner marginal edge portions of said sidewall portions including annular seating bead portions removably positionable for seated engagement with said seating and abutment flanges, an annular inner tire substantially U-shaped in cross-section, constructed of foam-like elastic and deformable material and including a pair of annular sides interconnected at their outer ends by means of a circumferentially extending bight portion, said sides being tapered and gradually increasing in thickness from their inner marginal edge portions toward the bight portion at which point the sides and bight portion are on the order of two to three inches thick, said bight portion being considerably thicker than the crown tread portion, said inner tire being removably disposed within and including outer surfaces conforming to the inner surfaces of said casing and disposed in surface to surface contacting relation with said inner surfaces, the inner marginal edge portions of said inner tire sides being tapered toward their edges and terminating adjacent the innermost portions of said side wall portions, and a flexible inner annular shield tube substantially U-shaped in cross-section and removably disposed within said inner tire, said shield tube including a pair of spaced annular leg portions interconnected at their outer marginal edge portions by means of an integral bight, the inner marginal edge portions of said leg portions including laterally and oppositely directed cylindrical flanges which terminate outwardly in anular abutment flanges, said shield tube cylindrical and abutment flanges being disposed between said annular seating bead portions and said wheel assembly abutment and seating flanges whereby pressure within said tire construction will urge said bead portions outwardly to clampingly engage said abutment flanges of said shield tube between said bead portions and said wheel assembly abutment flanges and thereby seal said shield tube cylindrical and abutment flanges with said cylindrical and abutment flanges of said rim portion and corresponding portions of said casing annular seating bead portions.

2. The combination of claim 1 wherein said inner tire is constructed of foam rubber.

3. The combination of claim 1 wherein said shield tube is constructed of somewhat flexible but tough material resistant to puncture by nails embedded in said casing and said inner tire.

References Cited in the file of this patent

UNITED STATES PATENTS

| 1,281,893 | Bacon | Oct. 15, 1918 |
| 2,752,979 | Knill et al. | July 3, 1956 |
| 2,877,819 | Gibbs | Mar. 17, 1959 |
| 2,925,846 | Hurt | Feb. 23, 1960 |

FOREIGN PATENTS

| 684,692 | France | Mar. 24, 1930 |